Patented Apr. 10, 1951

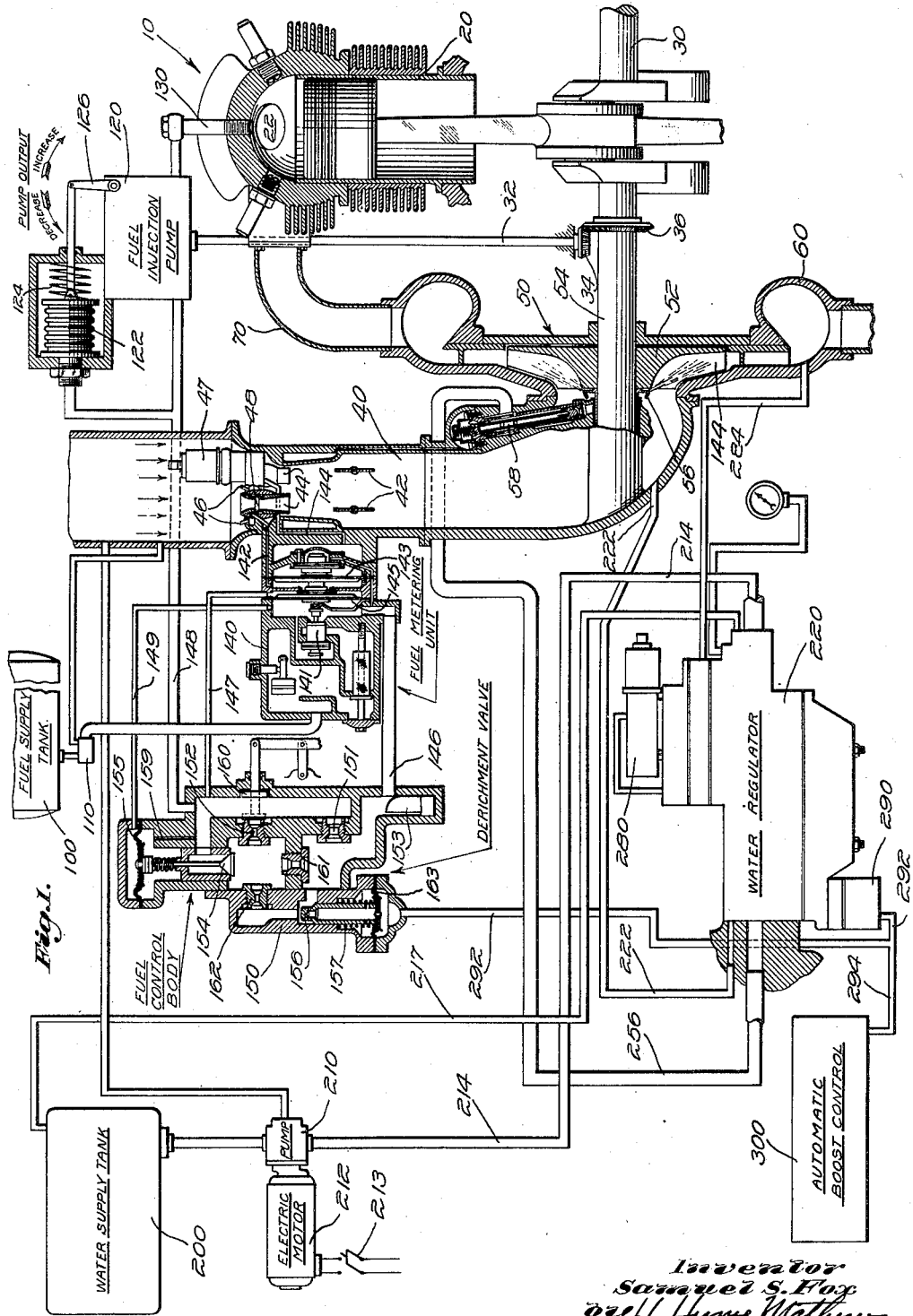

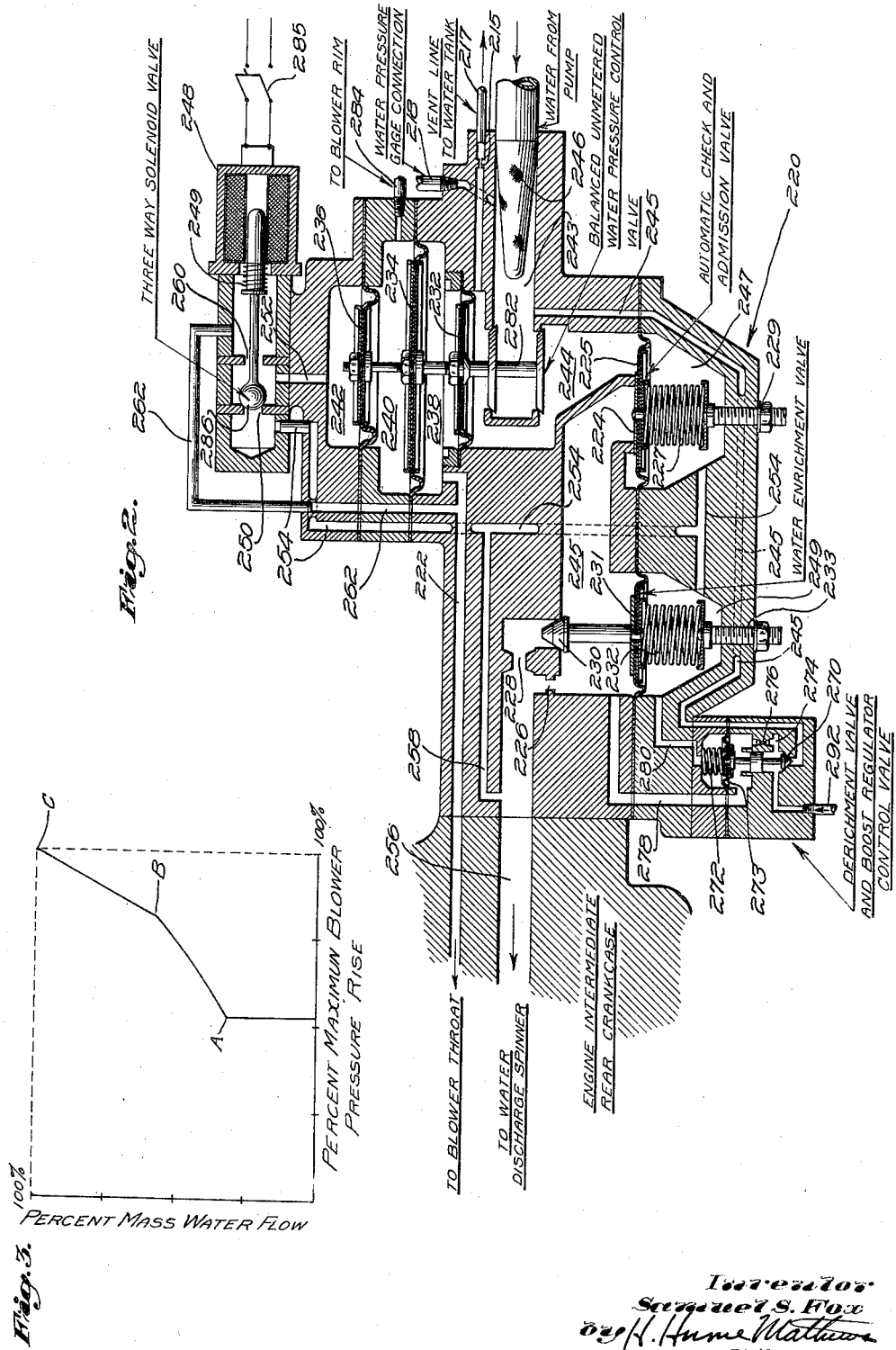

2,548,150

UNITED STATES PATENT OFFICE 2,548,150

FUEL AND WATER SYSTEM

Samuel S. Fox, West Hartford, Conn., assignor to United Aircraft Corporation, East Hartford, Conn., a corporation of Delaware Application May 7, 1947, Serial No. 746,611

13 Claims. (Cl. 123—25)

This invention relates to a method and apparatus for charging an engine combustion chamber, and particularly the combustion chamber or chambers of an aircraft engine, with fuel, air and a charge ingredient, such as water.

An object of the invention is to provide improvements in systems for supplying supercharged internal combustion engines with a combustion modifying ingredient.

Another object is to provide an improved fuel and ingredient supply system for an engine in which the fuel is injected directly into an engine combustion chamber and in which the ingredient is introduced into the combustion air before it enters the combustion chamber.

Another object is to provide an improved antidetonant injection system in which the admission and the flow of anti-detonant fluid to an engine are controlled in accordance with variations in a fluid pressure difference which is indicative of the tendency of the engine charge to detonate.

Another object is to provide a water injection system for a supercharged engine in which the water flow is controlled by the pressure rise across the supercharger.

A further object is to provide engine fuel and water supply systems in which fuel, the flow of which is controlled in accordance with variations in the mass rate of airflow to the engine, is injected directly into an engine combustion chamber, and in which water, the flow of which is controlled in accordance with the amount of compression of the engine intake air, is injected into the intake air before it enters the combustion chamber.

Other objects and advantages will be apparent from the specification and claims, and from the accompanying drawing which illustrates what is now considered to be a preferred embodiment of the invention.

In the drawings, Fig. 1 is a schematic view showing a radial, air cooled, supercharged aircraft engine having fuel and water supply systems constructed in accordance with the teaching of this invention.

Fig. 2 is a longitudinal sectional view on an enlarged scale of the water regulator shown diagrammatically in Fig. 1.

Fig. 3 is a graph illustrative of one mode of operation of the water flow regulator.

General description

A radial air cooled aircraft engine 10 of any conventional form is partially illustrated in Fig. 1 by the cylinder 20 and the crankshaft 30. The engine cylinders are supplied with combustion air through a main induction passage 40 and a main stage supercharger 50. Intake, or combustion, air flows from the supercharger collector ring 60 to the respective engine cylinders through individual induction pipes 70 and intake valves 22. In order to simplify the drawing, supercharger drive shaft 54 is shown as connected directly to the engine crankshaft; however, in practice the supercharger impeller 52 would ordinarily be driven, either at a fixed speed or at a variable speed relative to engine speed, through a speed increasing gear train located between the supercharger drive shaft and the engine crankshaft. Such supercharger drives are well-known in the art (see for instance Hobbs et al. Patent 2,400,307, issued May 14, 1946 and Hobbs Patent 2,323,601, issued July 6, 1943).

The supercharger may also be driven in other ways, for instance by a turbine or a separate engine rather than by the crankshaft 30.

The flow of intake air to the engine is controlled in the conventional way by manually or automatically actuated throttle valves 42 on the upstream side of the supercharger. Fuel flow to the engine is controlled, in predetermined ratio to the mass rate of flow of intake air, by a fuel valve 141.

The fuel system is basically the same as that disclosed in Beardsley application Serial No. 302,-749, filed November 3, 1939. It comprises a fuel supply pump 110, a fuel injection pump 120, a fuel metering unit 140 and a fuel control body or jet section 150. The fuel is directly injected into the engine through fuel injection nozzles 130 located in the tops of the respective cylinder heads.

Fuel metering unit 140 and fuel control body 150 are like those disclosed in Palmer application Serial No. 529,104, filed April 1, 1944. As is explained in detail in the Palmer application, these two units cooperate to maintain the fuel differential across the jets in the fuel control body 150, between the unmetered fuel line 146 and the metered fuel line 148, equal to the air metering differential between the throat passage 142 and scoop passage 144. This air metering differential is established as a function of the mass rate of flow of intake air by venturis 44, ram tubes 46 and altitude compensator or density capsule 47. Because the fuel metering head across the fuel control body 150 is maintained equal to the air metering head, the engine fuel air ratio is determined by the flow capacity of the jets in the fuel control body 150 and may be varied simply by controlling the flow through one or more of the jets. Thus, the rate of fuel flow is regulated, in predetermined relation to intake mass airflow solely by the metering unit 140 and the fuel control body 150. Supply pump 110 serves merely to deliver fuel at a substantially constant pressure to the inlet of the metering unit 140, while injection pump 120 serves only to raise the pressure of the fuel to a value suitable for direct injection into the engine cylinders.

A pump control 122 is provided for automatically regulating the capacity or delivery of the pump so that it is maintained equal to the fuel flow rate established by the metering and jet units. This control comprises an expansible chamber or bellows 122 responsive to the fluid pressure in the metered fuel line 148 and acting against a resilient element or spring 124 in such manner as to increase pump output by moving the pump capacity adjusting lever 126 to the right when the metered fuel pressure in line 148 increases, and to move lever 126 to the left in a direction to decrease the pump capacity when the pressure in line 148 decreases. The output or delivery of the pump is thus controlled in predetermined relation to intake mass air flow and does not vary with engine speed even though the pump may be engine driven, for instance by shaft 32 and bevel gears 34, 36.

Water (or other combustion modifying ingredient) is supplied to the engine from a tank 200 by a water supply pump 210 driven by an electric motor 212 controlled by switch 213. The water flows from the pump 210 through a water feed line 214 through the water regulator 220 (at a rate of flow determined thereby) and then through a water discharge line 256 to the discharge nozzle 58 and into the water spinner 56, by which it is sprayed into the air flowing through the impeller 52.

The rate of flow of water is controlled by regulator 220 in accordance with variations in pressure rise across the supercharger 50 between blower throat pressure line 222 and blower rim pressure line 284. Assuming electric motor 212 and pump 210 are operating, regulator 220 may be turned on or off by the water inlet solenoid control valve 280. In the off position of valve 280, water is prevented from flowing to the engine under any conditions; in the on position of this valve, water may flow to the spinner 56 and be discharged thereby into the intake air whenever the pressure difference between blower throat line 222 and blower rim line 284 exceeds a predetermined value. Further, the rate of flow of water is determined by the value or amount of this blower pressure rise.

Whenever water is flowing to the engine the derichment valve 156 is held closed by water pressure in transfer line 292, with consequent reduction in the engine fuel-air ratio. If the engine is equipped with a manifold pressure or boost control (illustrated diagrammatically at 300) such control is also reset whenever water is flowing to the engine, by water pressure in transfer line 294, so as to increase the maximum boost or intake pressure at which the engine may be operated. As the boost control 300 is a known device, which is fully disclosed in Palmer application Serial No. 529,104 it has not been described in detail herein.

Details of the fuel system

Air flowing to the engine creates a pressure differential between the impact or scoop tubes 46 and the throat passages 48 of the boost venturis 44. The pressure differential so produced is a function of the rate of flow by volume of engine intake air. In order to meter the fuel flow in accordance with the mass rate of intake airflow, rather than volume airflow, the automatic altitude or density compensator 46 is provided. This compensator operates in a known manner (for instance see Mock Patent No. 2,390,658) to maintain a pressure difference between the throat passage 142 and the scoop passage 144 which will be a function, or a measure, of the mass rate of flow of intake air.

The compensated air metering differential so maintained between passages 142 and 144 is applied across an actuating diaphragm 143 for the valve 141, in a sense tending to open the valve. But valve 141 is urged in a closing direction by an actuating diaphragm 145, subjected on one side to unmetered fuel pressure in line 146 and on the other side, by conduit 147, to metered fuel pressure in line 148. Consequently the valve 141 operates to regulate the rate of flow of fuel in such manner that the fuel metering drop between the unmetered pressure line 146 and the metered pressure line 148 is maintained substantially equal to the compensated air metering differential between passages 142 and 144. The fuel-air ratio may, therefore, be controlled simply by opening, closing, or varying the flow restriction of the jets in the fuel control body 150.

The normal, or basic fuel-air ratio is established by the continuously open main jet 151. Higher fuel-air ratios may be provided by manually opening valve 160 to permit flow through the auto-rich jet 152. Under high engine power conditions the fuel-air ratio is automatically increased so as to prevent detonation and over heating by economizer valve 154, which is actuated by a spring loaded diaphragm 155 subjected to unmetered fuel pressure by a transfer line 149 and to metered fuel pressure by a transfer passage 159. The total amount of enrichment, or increase in fuel-air ratio, that may be provided by jet 152 and valve 154 is limited by the combined flow capacity of two jets 161, 162; the flow of fuel through one of these jets, 162, is controlled by a derichment valve 156, thereby providing means for varying the maximum fuel-air ratio that may be established by operation of the fuel control body. During idling conditions only, the flow of fuel may be controlled by an idle valve 153, mechanically linked to the throttle valves.

As evident from the above, the fuel metering unit acts to regulate fuel flow from the supply pump 110 into the unmetered fuel line 148 solely in accordance with the mass rate of flow of combustion air, while the fuel control body establishes the fuel-air ratio solely in accordance with the setting of the auto-rich valve 160, economizer valve 154 and derichment valve 156. The rate of fuel flow through the metered fuel line 148 is, therefore, independent of the speed of pump 120. Consequently, if the pump at any given time happens to be delivering less fuel to the engine through the nozzle 130 than is supplied to the pump through metered fuel line 148, then the pressure in the metered fuel line 148 will increase. But this increase in pressure in line 148 causes the bellows 122 to expand against the force of spring 124, moving lever 126 to the right in a direction to increase pump capacity. This action continues until the rate of flow of fuel from the pump to the injection nozzle (or nozzles) 130 exactly equals the rate of flow of fuel through the line 148 to the pump. Similarly, if at any given time the pump happens to be delivering more fuel to the injection nozzle than it receives from the conduit 148 then the fluid pressure in bellows 122 will fall and spring 124 will cause the bellows to contract, moving lever 126 to the left so as to decrease pump capacity and reduce the rate of flow of fuel from the pump to the cylinder until it exactly equals the rate of flow of fuel delivered to the injection pump through the metered fuel line 148. The delivery or capacity of pump 120 is thus automatically adjusted to the rate of flow of metered fuel; it performs no metering function (except to divide the fuel among the various injection nozzles where more than one such nozzle is served by the pump) but acts only to increase the fuel pressure to a value suitable for direct cylinder injection.

*Details of the water system*

Water is supplied to the engine from a tank 200 by pump 210 driven by an electric motor 212 controlled by a switch 213. The water flow is controlled both as to its time of admission and rate of flow by the water regulator 220. It is introduced into the intake airstream at the entrance to the supercharger 50 by means of a spinner 56 which rotates with the impeller 52 and throws the water in a fine uniformly distributed spray into the air flowing through the vaned impeller passages 144. A discharge valve 58, which may be the same as that shown in the application of Robert C. Palmer, Serial No. 529,104, filed April 1, 1944, controls the discharge pressure of the water flowing from the metered water line 256 into the spinner 56.

As shown in the detailed view of Fig. 2, the flow of water through the regulator 220 is controlled by a balanced unmetered water pressure control valve 282, an automatic check and admission valve 224 and a pair of water metering orifices 226 and 228, the last of which orifices is in series with a variable orifice or water enrichment valve 230.

The unmetered water pressure control valve 282 is actuated by three fluid pressure responsive diaphragms 232, 234 and 236 which cooperate with the housing of the regulator 220 to form three chambers 238, 240 and 242. The lower chamber 238 is subjected at all times to blower throat pressure by the conduit 222 which connects the chamber with the induction passage 40 at a point located downstream of the throttles 42 and immediately upstream of the impeller 52 near the point at which water is sprayed into the airstream by the spinner 56. Chamber 240 is subjected at all times to blower rim pressure, or the pressure on the outlet side of the blower 50. This chamber is connected by the conduit 284 to the collector ring 60 and is therefore, in the embodiment of the invention shown in the drawing, subjected to engine cylinder intake manifold pressure. This pressure, relative to blower throat pressure in conduit 222, depends mainly upon the speed of rotation of impeller 52.

The pressure in the upper chamber 242 on the upper side of diaphragm 236 is determined by the position of the three-way solenoid operated valve 286. This valve is actuated by controlling the flow of current through solenoid 248 with switch 285 so that the valve assumes one of two positions. In the position shown in Fig. 2 the valve is biased to the left by spring 249 so that it closes the port 250 between the passage 252 which communicates with chamber 242 and the passage 254 which is connected to the metered water pressure line 256 on the downstream side of the jets 226, 228 by a branch passage 258. When valve 286 is moved to its other (or right-hand) position (by closing switch 285 to energize solenoid 248) it closes the port 260 which connects passage 252 with the conduit 262 leading to the blower throat line 222. When the valve 286 closes the left-hand port 250 the right-hand port 260 is open and vice versa. Thus the pressure in the upper diaphragm chamber 242 may be either blower throat pressure or metered water pressure depending upon the position of valve 286.

The lower side of diaphragm 232 is subjected to the pressure in the unmetered water pressure chamber 244 which pressure is regulated by the operation of the valve 282.

Water flow from the chamber 244 to the metering jet entrance chamber 245 is governed by the automatic check and admission valve 224 which is actuated by a fluid pressure responsive diaphragm 225 and a spring 227 the tension of which may be adjusted by a screw 229. When the valve 224 is closed the force tending to open it is determined by the fluid pressure in chambers 244 and 245, while the force tending to hold it closed is determined by the force of spring 227 and the fluid pressure exerted on the lower face of the diaphragm by the fluid in chamber 247, which is connected by passages 254 and 258 to the metered water pressure in line 256. The construction is such that the force tending to hold the valve open increases immediately upon opening of the valve because of the resultant increase in the pressure in chamber 245, thereby tending to prevent hunting or fluttering of the valve.

Because the main water metering jet 226 is continuously open, water immediately begins to flow to the engine through jet 226 when the pressure in chamber 244 increases to a value sufficient to open valve 224 against the force of spring 227 and the pressure exerted by the fluid in chamber 247. However, water does not flow through the jet 228 until the enrichment valve 230 opens, and this valve is normally held closed by a biasing spring 232. Chamber 249 on the lower side of diaphragm 231 is, like the chamber 247, subjected to metered water pressure by the passage 254 whereas the pressure on the upper side of the diaphragm will be that of the fluid in the chamber 245 which, when valve 224 is open, is equal to unmetered water pressure. When the pressure differential between the chambers 249 and 245 becomes sufficiently high, or reaches a predetermined value, then valve 230 is moved downwardly (opened) against the force of spring 232 to allow water to flow through the enrichment jet 228 as well as through the main jet 226. The valve 230 is preferably contoured and the rate of spring 232 so selected that this enrichment process is a gradual rather than a sudden one. An adjustment screw 233 is provided for changing the tension of spring 232 so as to facilitate selection of the pressure differential at which valve 230 begins to open.

It is desirable to alter the fuel-air ratio of the engine, or decrease the fuel mixture strength, when water is introduced into the fuel-air mixture. Where the engine is equipped with a boost or manifold pressure regulator, it is also desirable to reset this regulator to provide higher maximum boost pressures when water is introduced. To accomplish these results, the derichment and boost regulator control valve 270 is provided. This valve is normally held in its lower closed position by the force of spring 272 and in this position of the valve 270 the pressure in the transfer lines 292, 294 is maintained equal to the pressure in chamber 245 by the passage 274, flow restriction 276, and passage 278. Under such conditions the derichment valve 156 will be held in its open position by the spring 157 as shown in Fig. 1 and the boost control 300 will be in the condition in which the manifold or boost pressure is limited to a lower maximum.

The control valve 270 is also actuated by a fluid pressure responsive diaphragm 273 which is subjected on its lower side to the pressure in chamber 245 by way of passage 278 and on its upper side to metered water pressure in chamber 249 by way of passage 280. When the pressure differential across the diaphragm 273 increases to a predetermined value (which may be selected by proper selection of spring 272) the valve 270 is lifted to its open position against the force of spring 272. When the valve is so opened water may flow from the inlet water chamber 243 through the passage 245 and into the transfer lines 292, 294 leading to the derichment valve 156 and the boost control 300 respectively. Of course some water continues to flow through the restriction 276 but this orifice is made sufficiently small that such water flow is negligible. Consequently, the pressure in the lines 292 and 294 increases substantially to the inlet water pressure in chamber 243 when the control valve 270 is opened.

A filter or screen 216 is preferably provided to prevent the entry of foreign matter into the regulator 220. Branch line 218 may be connected with a chamber 243 and to a water pressure gauge (not shown) for the purpose of indicating the inlet pressure to the regulator. A bleed restriction 215 and a vent passage 217 are provided to return air or vapour from the top of the unmetered water pressure chamber 244 to the water tank 200.

*Operation*

Whenever the engine operates, fuel is injected directly into the engine cylinders through the fuel nozzles 130 by the injection pump 120 in timed relation to the rotation of crankshaft 30. The time of such injection is determined in a known manner by the fact that the engine pump is driven from the engine crank shaft through the gears 34, 36. However, the amount of fuel so injected is regulated in predetermined ratio to the mass rate of intake airflow by the fuel metering unit 140 and by the metering jets in the fuel control body 150.

Water will not be admitted to the engine so long as the solenoid valve 286 is in its left-hand position as shown in Fig. 2 even though the pump 210 and motor 212 are turned on. This is because the pressure in chamber 242 is then equal to blower throat pressure which is considerably less than metered fuel pressure (metered fuel pressure is held substantially constant by discharge valve 58) and therefore the regulated pressure in chamber 244, which is referenced to the pressure in chamber 242, never becomes high enough to open the check valve 224. Since valve 224 remains closed no water will flow to the engine and there will be no pressure drop across the orifice 226 and the pressure in chamber 245 will be the same as in the metered water line 256. The pressure in chamber 245 is therefore the same as the pressure in chamber 249 when there is no flow through the orifice 246 and consequently the enrichment valve 230 will be held in the closed position by the spring 232. The same is true of the control valve 270; spring 272 will hold this valve closed when there is no flow through orifice 226 and consequently no pressure differential across the diaphragm 273.

As soon as the solenoid operated valve 286 is shifted to its right-hand position by closing of the manually operated switch 285, the pressure in chamber 242 acting on the upper diaphragm 236 is immediately increased to the metered fuel pressure on the downstream side of the orifices 226, 228. The pressure in chamber 244, which as stated above is referenced to the pressure in chamber 242, therefore increases by an amount equal to the pressure increase in chamber 242 (valve 282 functions so that when pump 210 is running the pressure in chamber 244 is at all times greater than the pressure in chamber 242 by an amount determined by the pressure differential between chambers 240 and 238, or the blower pressure rise).

When the blower pressure rise increases to a sufficiently high value the pressure in chamber 244 becomes greater than the metered water pressure in chambers 242 and hence 247 by an amount sufficient to overcome the force of spring 227, thereby opening the automatic admission valve 224 so that the pressure in chamber 245 becomes equal to the pressure in chamber 244 and permitting water to flow to the engine. The rate of water flow (as indicated at point A in Fig. 3) is determined by the preselected flow capacity of jet 226 and by the pressure differential across the jet, which, as indicated above, is determined by the blower pressure rise.

As the water metering pressure differential across the jet 226 and across the diaphragm 231 increases to a predetermined value (illustrated at point B in Fig. 3) the valve 230 will be opened against the force of spring 232 to further increase the rate of flow (to the point C in Fig. 3) by providing an additional flow through the enrichment valve 230 and the jet 228.

A similar action takes place in connection with the control valve 270. At a predetermined water metering pressure differential across diaphragm 273, the valve 270 is opened against the force of spring 272 and admits inlet water pressure from the chamber 243 to the transfer lines 292, 294 thereby closing the derichment valve 156 (Fig. 2) to decrease the fuel mixture strength and resetting the boost control 300 to provide an increased maximum manifold pressure. Spring 272 is preferably so chosen that this action takes place at the time the pressure in chamber 245 increases from metered to unmetered water pressure as a result of the opening of admission valve 224.

It is to be understood that the invention is not limited to the specific embodiment herein illustrated and described, but may be used in other ways without departure from its spirit as defined by the following claims.

I claim:

1. In combination with an engine having a supercharger, means for supplying water to the engine including a water supply line, and means responsive to the pressure rise across the supercharger for directly controlling said water supplying means, said means including a diaphragm connected to a water pressure control valve in said water supply line.

2. In an engine having a combustion air induction passage, an air compressor in said passage, and means controlled by a fluid pressure differential created by said compressor for introducing water into the combustion air, said means including a diaphragm connected to a balanced water pressure control valve.

3. Apparatus according to claim 2, including Venturi means in said passage for establishing a second fluid pressure differential which is a measure of the rate of flow of combustion air to the engine, and means controlled by said second fluid pressure differential for introducing fuel into the combustion air.

4. In combination, an air passage having an air compressor therein, means for introducing a coolant fluid into said air passage including a coolant supply line, and means subjected to fluid pressures on both the inlet and outlet sides of said compressor for directly regulating the flow of said coolant fluid, said means including a diaphragm connected to a coolant pressure control valve in said coolant supply line.

5. Apparatus according to claim 4, including a throttle valve for regulating said blower inlet fluid pressure.

6. In combination with an aircraft engine supercharger, an anti-detonant injection apparatus, an anti-detonant supply, a pump for supplying anti-detonant fuel to said apparatus under pressure, and means for actuating said apparatus to control the flow of anti-detonant in accordance with variations in the fluid pressure difference between the inlet and outlet of said supercharger, said apparatus including an anti-detonant flow controlling valve connected to a diaphragm subjected to the pressure rise directly across said supercharger.

7. A combination according to claim 6, in which said apparatus includes means controlled by the pressure of the anti-detonant at a point located downstream of said valve for changing an engine operating condition such as fuel-air ratio.

8. A combination according to claim 6, in which said apparatus includes an automatically operative valve located downstream of said flow controlling valve for preventing the flow of anti-detonant to the engine except when said supercharger pressure rise exceeds a predetermined value.

9. In an engine having a combustion chamber and a supercharger for supplying combustion air thereto, means for supplying liquid fuel to said engine, means for supplying a combustion modifying liquid to said engine, means for discharging at least one of said liquids into the combustion air within said combustion chamber, means responsive to variations in the rate of flow of said combustion air for regulating the flow of one of said liquids, and means responsive to variations in combustion air pressure on the outlet side of said supercharger for directly controlling the flow of the other of said liquids.

10. In an engine having a combustion chamber and a supercharger for supplying combustion air thereto, means for supplying liquid fuel to said engine, means for supplying a combustion modifying liquid to said engine, means for discharging at least one of said liquids into the combustion air within said combustion chamber, means responsive to variations in the rate of flow of said combustion air for regulating the flow of one of said liquids, and means responsive to variations in combustion air pressure on the inlet side of said supercharger for directly controlling the flow of the other of said liquids.

11. In an engine having a combustion chamber and a supercharger for supplying combustion air thereto, means for supplying liquid fuel to said engine, means for supplying a combustion modifying liquid to said engine, means for discharging at least one of said liquids into the combustion air within said combustion chamber, means responsive to variations in the rate of flow of said combustion air for regulating the flow of one of said liquids, and means responsive to variations in combustion air pressure on both the inlet and outlet sides of said supercharger for directly controlling the flow of the other of said liquids.

12. A flow regulator comprising a pressure regulating valve connected in series with a flow metering orifice and actuated by a diaphragm subjected to a controlling fluid pressure differential and by a pair of diaphragms subjected respectively to the fluid pressure on the downstream side of said orifice and to the regulated fluid pressure on the downstream side of said valve in which the flow from said valve to said orifice is automatically controlled by means responsive to said regulated pressure.

13. A regulator according to claim 12, in which said last named means is actuated in accordance with variations in said regulated pressure relative to the pressure on the downstream side of said orifice.

SAMUEL S. FOX.

REFERENCES CITED

The following references are of record in the file of this patent:

UNITED STATES PATENTS

| Number | Name | Date |
|---|---|---|
| 2,392,565 | Anderson et al. | Jan. 8, 1946 |
| 2,397,984 | Schorn | Apr. 9, 1946 |
| 2,431,590 | Smith | Nov. 25, 1947 |